No. 809,383. PATENTED JAN. 9, 1906.
L. P. LOWE.
METHOD OF CLEANSING MANUFACTURED GASES.
APPLICATION FILED JUNE 17, 1903.

WITNESSES
K. Lockwood Nevins.
M. Stuart

INVENTOR
L. P. Lowe
By
Francis M. Wright
Attorney.

UNITED STATES PATENT OFFICE.

LEON P. LOWE, OF SAN FRANCISCO, CALIFORNIA.

METHOD OF CLEANSING MANUFACTURED GASES.

No. 809,383. Specification of Letters Patent. Patented Jan. 9, 1906.

Application filed June 17, 1903. Serial No. 161,795.

*To all whom it may concern:*

Be it known that I, LEON P. LOWE, a citizen of the United States, residing at San Francisco, in the county of San Francisco and State of California, have invented certain new and useful Improvements in Methods of Cleansing Manufactured Gases, of which the following is a specification.

My invention consists of a method of cleansing manufactured gases by removing therefrom such foreign substances as condensable hydrocarbons or solid carbonaceous or other foreign substances by compression and friction and the saturation of same with aqueous vapor preferably in the form of steam.

My invention embodies novel features, as will be hereinafter set forth and definitely claimed.

In the manufacture of ordinary commercial gases certain substances usually classed as impurities are removed with great difficulty and cannot be eliminated by the ordinary methods in general use of washing and scrubbing the gas, and I have found that if the gases containing such substances are compressed and subjected to considerable frictional resistance, simultaneously bringing into contact therewith watery vapor preferably in the form of steam, the substances described are condensed and saturated to such an extent as to greatly increase their specific gravity, thus causing the ready falling of same and permitting of their recovery and removal. When steam is used for purposes of saturation as described, it is frequently necessary to remove same before using the gas, and this is best accomplished by condensing it by passing same over cooled surfaces.

To accomplish the foregoing, I use the apparatus shown in the accompanying drawings or modifications of same, of which the following is a description.

Figure 1:
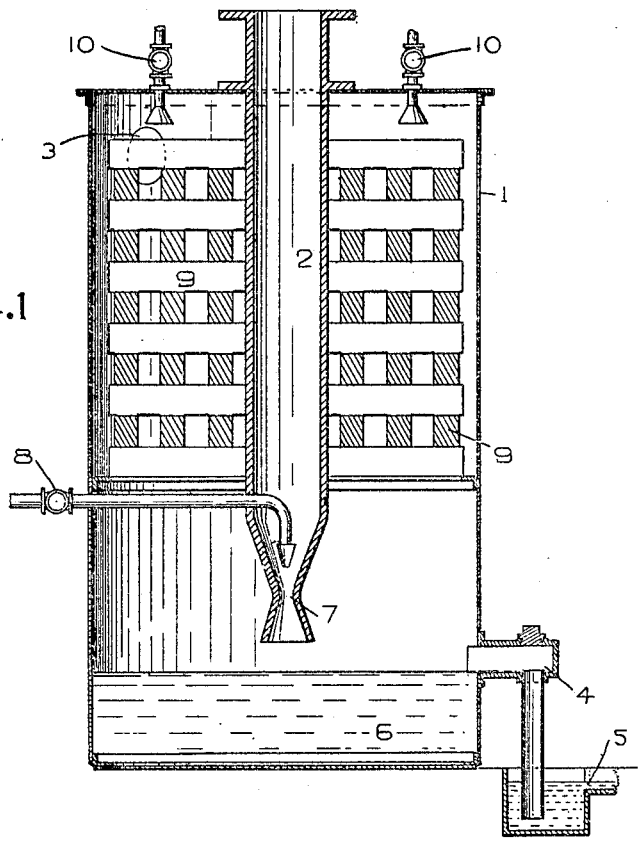
Figure 2:
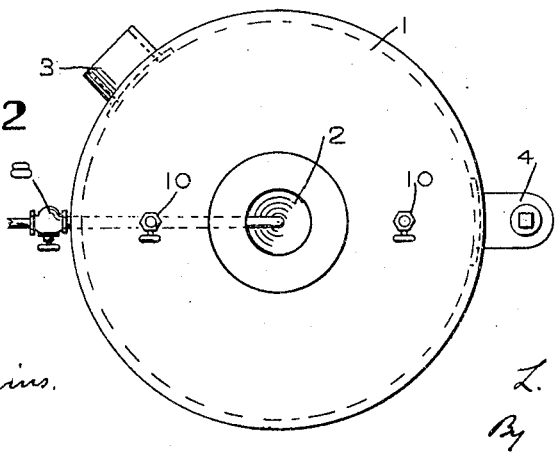

Figure 1 represents a vertical sectional elevation of the gas-condensing device embodying my invention. Fig. 2 represents a plan of same.

Similar numerals of reference indicate corresponding parts in the various figures.

1 is a shell, preferably of cylindrical form and preferably composed of metal.

2 is an inlet-pipe to condenser 1.

3 is an outlet-pipe from condenser 1.

4 is an overflow-pipe from condenser 1 placed at such a height as to permit of the retention of a certain amount of water 6 in the bottom of condenser 1.

5 is an ordinary hydraulic seal which receives overflow-pipe 4.

7 is a constriction in inlet-pipe 2 of much the same form and construction as an ordinary steam-jet exhauster.

8 is a steam-supply pipe fitted with a suitable controlling-valve extending into the inlet-pipe 2 and constriction 7.

9 is an open-work mass of suitable solid substance over the surface of which water is sprayed by admission through pipes 10.

The operation of this apparatus is as follows: Water is first admitted through pipes 10 and passing down over the surface of material 9 collects in the bottom of condenser 1 to the height of the overflow connection 4, in which condition the condenser is ready for the reception of gas, which is admitted through inlet-pipe 2 and by the exhausting action of the constriction 7, in combination with the steam-pipe 8, is forced through the narrow constriction 7, which causes a considerable compression of the gases and the simultaneous saturation thereof with the steam entering through pipe 8, thus causing a condensing and collection of any foreign substance contained in the gas to such an extent as to greatly increase its weight, in which state it will readily fall from the gas into the lower portion of the condenser 1 containing the water 6, wherein it will be trapped and retained. The gas thus freed from the described foreign substances is still saturated with steam and in a heated condition owing to same, in which state it passes upward through the cooled material 9, over which water, issuing from pipes 10, is passing downward in a reversed direction to that traveled by the gas. The action is to condense the steam into cold water, thus thoroughly removing the same and permitting the gas to escape from outlet-pipe 3 in a thoroughly cooled and cleansed condition.

I claim—

1. The process of cleansing gas which consists in subjecting it to compression and frictional resistance and simultaneously saturating it with steam, thereby greatly increasing the several masses of the impurities, and projecting the mixture of gas and impurities downward toward the surface of a continuous body of water with sufficient velocity to throw said impurities into contact with the water, the lighter gas escaping said contact, and withdrawing the purified gas, substantially as described.

2. The process of cleansing gas which consists in subjecting it to compression and frictional resistance and simultaneously saturating it with steam, thereby greatly increasing the several masses of the impurities, and projecting the mixture of gas and impurities downward toward the surface of a continuous body of water with sufficient velocity to throw said impurities into contact with the water, the lighter gas escaping said contact, withdrawing the purified gas, and removing the steam, substantially as described.

In witness whereof I have hereunto set my hand in the presence of two subscribing witnesses.

L. P. LOWE.

Witnesses:
    FRANCIS M. WRIGHT,
    M. STUART.